US007497891B2

(12) United States Patent
Peacock

(10) Patent No.: US 7,497,891 B2
(45) Date of Patent: Mar. 3, 2009

(54) METHOD FOR PRODUCING A FERTILIZER WITH MICRONUTRIENTS

(75) Inventor: Lawrence Alan Peacock, Riverview, FL (US)

(73) Assignee: The Mosaic Company, Plymouth, MN (US)

( * ) Notice: Subject to any disclaimer, the term of this patent is extended or adjusted under 35 U.S.C. 154(b) by 869 days.

(21) Appl. No.: 10/929,501

(22) Filed: Aug. 31, 2004

(65) Prior Publication Data

US 2006/0042338 A1    Mar. 2, 2006

(51) Int. Cl.
C05B 7/00 (2006.01)
(52) U.S. Cl. .................. 71/33; 71/29; 71/31; 71/34; 71/35; 71/37; 71/38
(58) Field of Classification Search .............. 71/33, 71/34, 29, 31, 35, 37, 38
See application file for complete search history.

(56) References Cited

U.S. PATENT DOCUMENTS

| 2,902,342 | A | | 9/1959 | Kerley, Jr. |
| 3,153,574 | A | | 10/1964 | Achorn et al. |
| 3,244,500 | A | * | 4/1966 | Stinson et al. ............. 71/1 |
| 3,730,700 | A | | 5/1973 | Groenveld et al. |
| 3,954,942 | A | * | 5/1976 | Achorn et al. ............. 423/313 |
| 3,985,538 | A | | 10/1976 | Hicks et al. |
| 4,028,087 | A | * | 6/1977 | Schultz et al. ............. 71/25 |
| 4,134,750 | A | | 1/1979 | Norton et al. |
| 4,377,406 | A | | 3/1983 | Achorn et al. |
| 4,601,891 | A | | 7/1986 | McGill et al. |
| 6,241,796 | B1 | * | 6/2001 | Jardine et al. ............. 71/35 |
| 6,280,494 | B1 | | 8/2001 | Jardine |

FOREIGN PATENT DOCUMENTS

WO    WO 03/031375    4/2003

OTHER PUBLICATIONS

Wang, Jinming, "Application of Double Tubular Reactors to DAP and NPK Production", Sulfur Phosphorous and Bulk Materials Handling Related Engineering, No. 1, 1998.*
Lectures on Technology for Ammonium Phosphates, Lesson 7: Ammonium Phosphate Production Using Pipe Reactor Slurry Granulation Process, Luo Chengyuan, Lin Le, Zhong Benhe, Zhang Yunxiang, Jul. 2000; vol. 15; No. 4, Institute of Chemical Engineering, Sichuan University, Chengdu, Sichuan China.

(Continued)

*Primary Examiner*—Jessica L Ward
*Assistant Examiner*—Erin P Barry
(74) *Attorney, Agent, or Firm*—Patterson, Thuente, Skaar, Christensen, PA

(57) ABSTRACT

According to a method of producing a phosphate fertilizer, a first portion of the phosphate is produced in a pipe cross reactor, and a second portion of the phosphate is produced in a pre-neutralizer. Both the first and second portions of the phosphate are supplied to a granulator. Ammonia is added to the granulator to react with the first and second portions of the phosphate. To produce the first portion of the phosphate, a micronutrient is added to phosphoric acid to produce an enriched acid, and the enriched acid and ammonia are added to the pipe cross reactor where they are allowed to react to produce ammonium phosphate.

31 Claims, 4 Drawing Sheets

OTHER PUBLICATIONS

Appendix D1—Statement of Relevance for D1.
Control of Neutralization Degree In Production of Ammonium Phosphate, Ge Zuyuan, Phosphate & Compound Fertilizer, Nov. 4, 1998.
Appendix D2—Statement of Relevance for D2.
Use of Double-Pipe Reactor in Production of DAP and NPK, Sulfur Phosphorus & Bulk Materials Handling Related Engineering, Wang Jinming, Nov. 1, 1998.
Appendix D3—Statement of Relevance for D3.
Notification of the First Office Action.
Claims submitted to Chinese counsel for translation and filing with Chinese SIPO in the matter.
Application of Double Tubular Reactors to DAP and NPK Production Materials Handling Related Engineering, Wang Jinming, No. 1, 1998.
Achorn, F.P. et al., "Granulation using the pipe-cross reactor", Manual of Fertilizer Processing (1986), pp. 307-331.
Partial European Search Report, Application No. 05076959.5-1218, issued on Jun. 17, 2008, 5 pages.

* cited by examiner

METHOD FOR PRODUCING A FERTILIZER WITH MICRONUTRIENTS

BACKGROUND OF THE INVENTION

In addition to primary nutrients, such as carbon, hydrogen, oxygen, nitrogen, phosphorus and potash, plants require secondary nutrients and micronutrients. Secondary nutrients are required in quantities smaller than primary nutrients, and include calcium, sulfur and magnesium. Micronutrients are required in very small quantities, smaller than the quantities of secondary nutrients, and include zinc, manganese, iron, copper, molybdenum, boron, chlorine, cobalt and sodium.

The primary nutrients nitrogen phosphorus, and potash may be supplied through fertilizers. Depending on the needs of the plant, it is also possible to supply micronutrients through fertilizers. However, because of the very small quantities, it is difficult to incorporate the micronutrients into fertilizers in a manner that will deliver small amounts of the micronutrient(s) to each plant substantially uniformly.

SUMMARY OF THE INVENTION

To address these and/or other concerns, the inventor proposes a method of producing a phosphate fertilizer in which a first portion of the phosphate is produced in a pipe cross reactor, and a second portion of the phosphate is produced in a pre-neutralizer. Both the first and second portions of the phosphate are supplied to a granulator. Ammonia is added to the granulator to react with the first and second portions of the phosphate.

The second portion may be 22 wt. % to 38 wt. % of the phosphate fertilizer, with a remainder being produced in the pipe cross reactor and the granulator. The phosphate fertilizer may be monoammonium phosphate or diammonium phosphate.

A target ratio of ammonia to phosphoric acid may be used to achieve a desired product. In this case, ammonia and phosphoric acid may be supplied to the pre-neutralizer with an ammonia deficiency and an ammonia to phosphoric acid ratio less than the target ratio. The ammonia added to the granulator compensates for the ammonia deficiency. As a result of the deficiency, the second portion of the phosphate may have a solubility that is greater than a solubility of phosphate produced using the target ratio. For the pipe cross reactor, the ammonia and phosphoric acid may be supplied substantially at the target ratio.

The inventor also proposes a method of producing a phosphate fertilizer in which a micronutrient is added to phosphoric acid to produce an enriched acid, and the enriched acid and ammonia are added to a pipe cross reactor where they are allowed to react to produce ammonium phosphate. A single micronutrient or a plurality of micronutrients may be used. Zinc, manganese, iron, copper, molybdenum, boron, chlorine, cobalt and sodium are examples of possible micronutrients.

In this case a first portion of the phosphate may be produced in the pipe cross reactor. To produce a second portion of the phosphate, ammonia and phosphoric acid may be combined in a pre-neutralizer. A micronutrient may be added to the phosphoric acid before the phosphoric acid is combined with ammonia in the pre-neutralizer. The first and second portions of the phosphate may be added to a granulator.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1A:
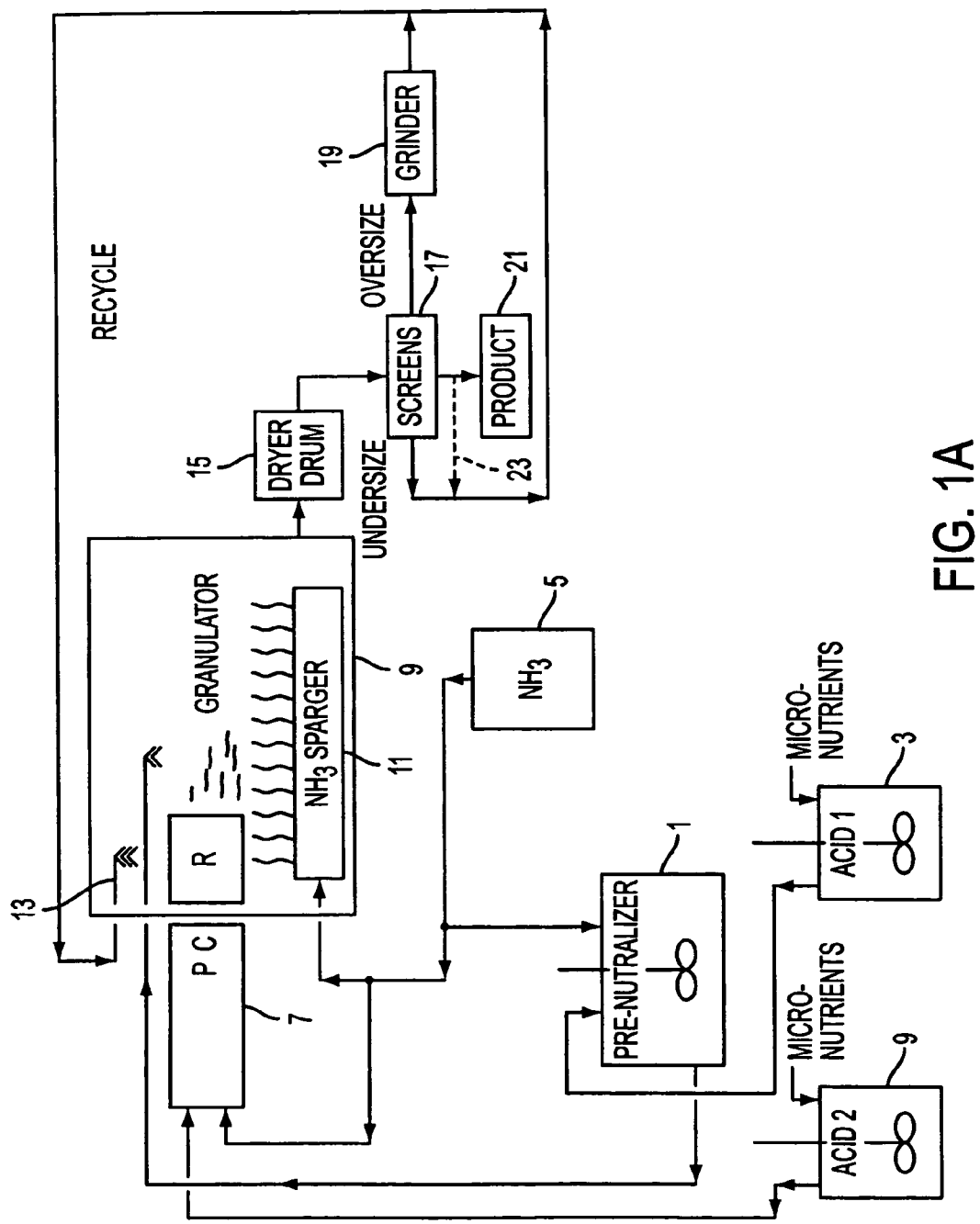
FIG. 1A is a schematic diagram of a system for producing a fertilizer having micronutrients added thereto.

Reference will now be made in detail to the preferred embodiments of the present invention, examples of which are illustrated in the accompanying drawings, wherein like reference numerals refer to like elements throughout.

FIG. 1A is a schematic diagram of a system for producing a fertilizer having micronutrients added thereto. In FIG. 1A, an ammonium phosphate fertilizer is produced by reacting phosphoric acid ($H_3PO_4$) with ammonia ($NH_3$) in an exothermic reaction. Monoammonium phosphate ("MAP") or diammonium phosphate ("DAP") can be produced according to the following reactions, depending on the ratio of the two reactants.

$NH_3 + H_3PO_4 => (NH_4)H_2PO_4$ (MAP)

$2NH_3 + H_3PO_4 => (NH_4)_2H PO_4$ (DAP)

The process shown in FIG. 1A involves the combination of a forward titration reaction and a pipe cross reactor reaction. A preneutralizer 1 is supplied with phosphoric acid from a first acid tank 3 and ammonia from an ammonia source 5. The pipe cross reactor reaction occurs in pipe cross reactor (PCR) 7, which is supplied with phosphoric acid from a second acid tank 9 and ammonia from the ammonia source 5. Micronutrients may be supplied to the fertilizer by first dissolving the micronutrients in the first acid tank 3 and/or the second acid tank 9. Although different ratios may be used, 33 wt. % to 99 wt. %, more particularly, 50 wt. % to 80 wt. %, and still more particularly 62 wt. % to 72 wt. % of the ammonium phosphate may be produced in the PCR 7, with a remainder being produced in the preneutralizer 1.

The preneutralizer 1 is a stirred reactor that produces a slurry of ammonium phosphate. Either MAP or DAP or a combination of the two may be produced in the preneutralizer 1 depending on the ratio of ammonia and phosphoric acid. The ammonium phosphate produced in the preneutralizer 1 is supplied to a granulator 9. The contact time in the preneutralizer may be 5 to 55 minutes, more particularly, 15 to 45 minutes, and still more particularly, 25 to 35 minutes.

The PCR 7 is a pipe-shaped reactor where ammonium phosphate is formed by reacting ammonia and phosphoric acid. As in the preneutralizer 1, either MAP or DAP or a combination of the two may be produced in the PCR 7. The heat discharged at the exit to the PCR 7 was 600,000 BTU/$hr/in^2$ in one example, as the reaction between ammonia and phosphoric acid is exothermic. The high temperature in the PCR 7 aids in driving the reaction forward at a high rate.

The ammonium phosphate exits the PCR 7 into the granulator 9 as a spray because the ammonium phosphate is molten due to the high temperature in the PCR 7. After exiting, it immediately cools to form granules. The shape of these granules may be irregular, having bumps. These bumps may be eliminated when the ammonium phosphate from the PCR 7 is further reacted with ammonia in the granulator 9. The granulator 9 therefore functions to form the fertilizer into a product that can be easily applied to the appropriate plantings.

As will be discussed in more detail below, the granulator 9 is formed as a rolling bed. A bed of ammonium phosphate inside the granulator extends from a floor to partially up the rotating wall, as the granulator rotates. In addition to the outputs of the preneutralizer 1 and the PCR 7, the granulator is also supplied with ammonia from an ammonia sparger 11. The ammonia emitted from the ammonia sparger 11 completes the ammonium phosphate reaction. The reaction is therefore a forward titration reaction. The granulator 9 is also supplied with recycled fertilizer from a recycle stream 13.

The ammonium phosphate formed in the granulator 9 is substantially free from bumps and forms granules having substantially high sphericity. The higher the sphericity of the ammonium phosphate granules, the more easily the granules flow for increased efficiency in storage, handling, transportation, and application. The sphericity increases as the ammonium phosphate granules are repeatedly recycled back to the granulator 9 via recycle stream 13.

The exit from the granulator is at reduced elevation relative to the entrance, thus causing the product to exit for drying in a dryer drum 15. In the dryer drum 15, hot air, at a temperature of perhaps from 400 to 700° F., and more particularly 500 to 600° F., is passed over the fertilizer as it dries. The hot air may be produced from a gas burner, and may be sent through the drier in a direction co-current to the flow direction of the fertilizer. The dryer may also be formed as a rotating bed dryer.

From the dryer drum 15, the dried product is sent to screens 17. The screens 17 may include a plurality of vibrating screens that separate particles that are too small or too large relative to a predetermined target size. Oversized particles are sent to a grinder 19. For this purpose, a roll mill, a chain mill, or other crushing device may be used to grind the oversized particles to reduce the size of the particles. The ground particles are combined with undersized particles and recycled back to the granulator 9. Stream 13 is referred to as "recycled fines."

The screens 17 also separate a product stream containing particles satisfying the predetermined target size. The product stream is cooled in a collector 21. Before being sent to the collector for cooling, a portion of the correctly sized particles may be recycled back to the granulator 9, together with the undersized particles and the ground oversized particles. The potential recycle of correctly sized particles is labeled as stream 23 in FIG. 1A. Any volatiles emitted during the cooling process, as well as volatiles are emitted from the drying drum 15 or the granulator 9 may be fed to a scrubber where they are treated before venting to the atmosphere.

Figure 1B:
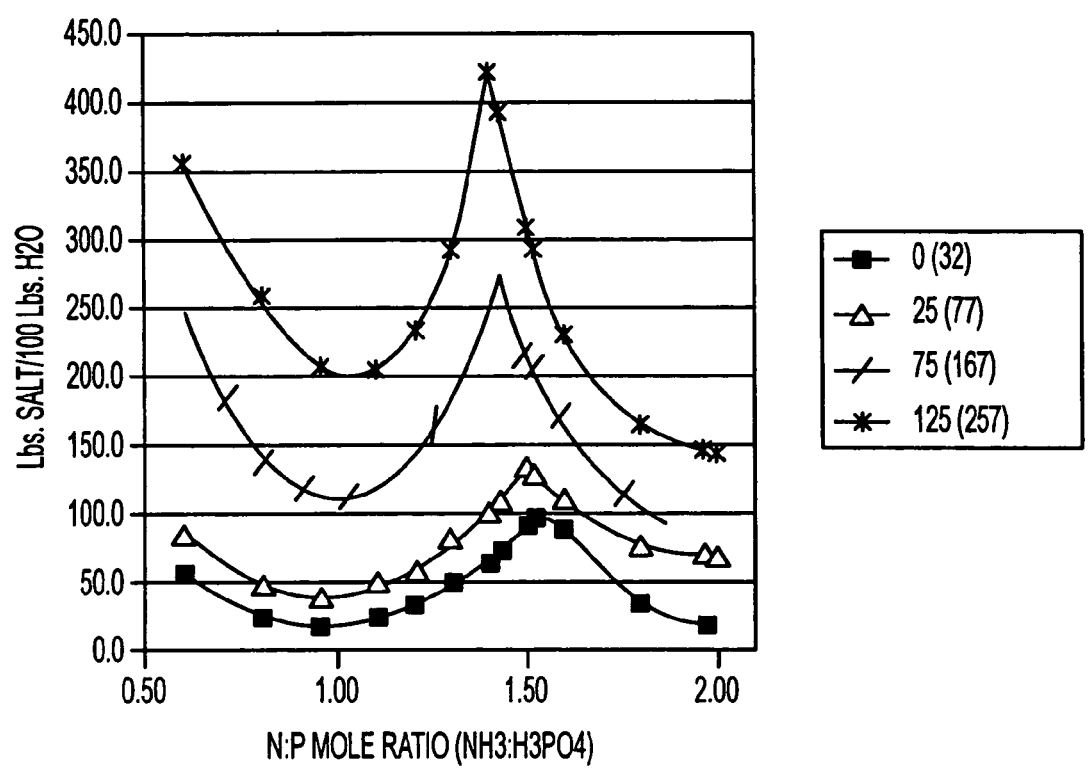
FIG. 1B is a solubility curve, showing the water solubility of ammonium phosphate at different temperatures for a varying molar ratio of nitrogen to phosphorous.

FIG. 1B is a solubility curve (Frank Achorn and David Saliday, "Latest Developments in use of TVA Rotary Ammonia Granulator", AlChE Meeting, Washington, D.C., November 1983), showing the water solubility of ammonium phosphate at different temperatures for a varying molar ratio of nitrogen to phosphorous. As can be seen, there are two dips in the solubility curve, respectively at N/P ratios of 1.0 and 2.0. At these dips, very little ammonium phosphate remains in solution. The dip at 1.0 represents MAP, and the dip at 2.0 represents DAP.

The amounts of ammonia and phosphoric acid that are fed to the various components in FIG. 1A are controlled based on the solubility curve. FIG. 1B shows that the solubility increases with increasing temperatures. The PCR 7 runs at a greatly elevated temperature. At these temperatures, the ammonium phosphate is a molten liquid. Ammonia and phosphoric acid can be fed into the PCR 7 at the desired ratio of ammonia to phosphoric acid (N/P) in a range of about 1.0 to 2.0.

On the other hand, the ammonium phosphate, which travels from the preneutralizer 1 to the granulator 9, is at a reduced temperature. The N/P mole ratio in the preneutralizer is outside of the low solubility dips, and this can help maintain the ammonium phosphate as a slurry before introduction to the granulator 9. To make MAP, the N/P ratio of reactants fed to the preneutralizer may be 0.3 to 0.9, more particularly 0.5 to 0.7, and still more particularly 0.55 to 0.65. To make DAP, the N/P ratio of reactants fed to the preneutralizer may be 1.1 to 1.7, more particularly 1.3 to 1.5, and still more particularly 1.35 to 1.45.

When making either MAP or DAP, the preneutralizer runs lean on the amount of ammonia. The reactions to produce ammonium phosphate are completed in the granulator 9. The ammonia supplied to the granulator 9 via the sparger 11 compensates for the ammonia deficiency in the preneutralizer 1. A portion of the ammonia released from the ammonia sparger 11 may remain unreacted. To ensure that the appropriate amount of ammonia is fed to the granulator 9 through the ammonia sparger 11, the ammonium phosphate product can be analyzed to determine the N/P ratio of the product. The N/P ratio is reflected in the pH of the product. Therefore, a simple pH test may be used to determine the N/P ratio.

The first and second acid tanks 3, 9 must be sufficiently well agitated to dissolve the micronutrients in the acid, if the micronutrients are to be added. In addition to the micronutrients, a sulfate source may be added to one or both of the acid tanks 3, 9, as described in U.S. Pat. No. 6,544,313, which is hereby incorporated by reference. One or both of the acid tanks 3, 9 have baffles for increased mixing efficiency. The acid tanks 3, 9 are stirred with a propeller-type agitator.

Although different temperatures can be used, it may be desirable for the acid tanks 3, 9 to be heated to a temperature associated with the reaction temperature of the preneutralizer 1 and/or the PCR 7. Elevated temperatures also assist in dissolving the micronutrients. The temperature of the acid tanks 3, 9 may be in a range of from 140 to 260° F., more particularly, 175 to 225° F., and still more particularly 195 to 205° F. These temperatures may approximate the temperature of the preneutralizer.

The reaction to produce ammonium phosphate is an exothermic reaction. If $NH_3$ is used in its natural gaseous state at or above room temperatures, then a violent reaction between gaseous $NH_3$ and $H_3PO_4$ will result. It is, therefore, suggested that liquid $NH_3$ be used, which requires heat to vaporize it to gaseous $NH_3$ thus aiding in the removal of some of heat from the system. The use of liquid $NH_3$ is especially useful in the PCR 7, where the temperature may be in the range of about 220 to 380° F. The $NH_3$ when added to the preneutralizer 1 begins the exothermic reaction with $H_3PO_4$, causing the temperature to increase above the acid temperature. The temperature increase is dependent on the amount of ammonia added. For example, the temperature in the preneutralizer may be 200 to 275° F. and more particularly 225 to 250° F.

The acid tanks are heated by conventional means such as steam jacketing. In addition to the heat supplied in this manner, if micronutrients are added to the acid tank, there may be an exothermic reaction with the phosphoric acid. For example, when zinc oxide is added as a micronutrient, the heat produced by the reaction with phosphoric acid may increase the temperature in the acid tank by 5 to 35° F., more particularly by 10 to 30° F. and still more particularly by 15 to 25° F. The addition of micronutrients may therefore reduce the energy required to heat the acid tank(s).

Figure 2:
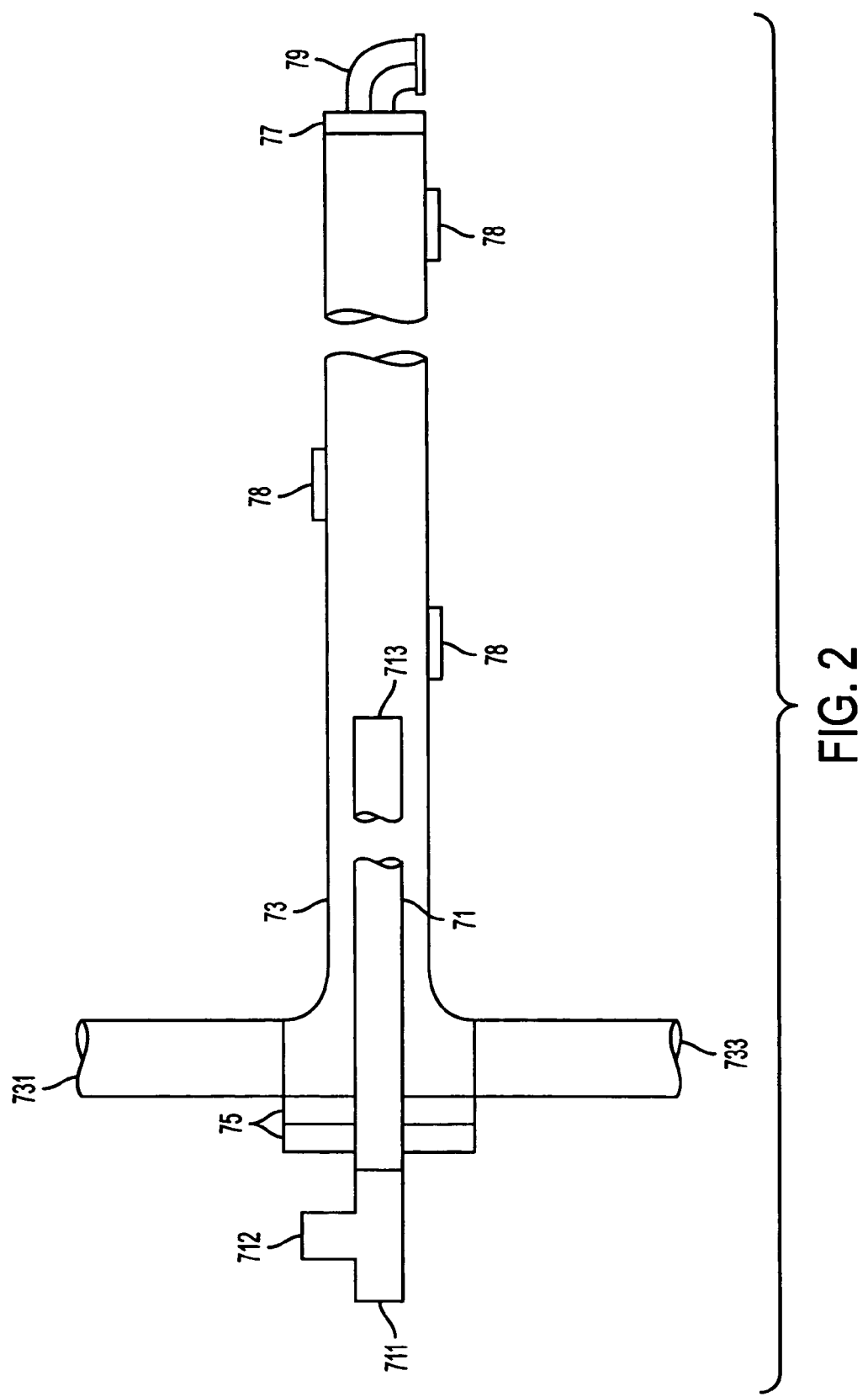
FIG. 2 is a schematic view of a pipe cross reactor shown in FIG. 1.

FIG. 2 is a schematic view of a pipe cross reactor shown in FIG. 1. The pipe cross reactor has an inner pipe 71 and an outer pipe 73. There are two entrances to the inner pipe 71. Liquid ammonia is introduced through a first opening 711, and steam is introduced through a second opening 712. The inner pipe 71 has a discharge 713 located at a downstream location in the pipe cross reactor. The inner pipe 71 may extend 1 to 25% through the length of the outer pipe 73. More particularly, the inner pipe 71 may extend 3 to 17% and still more particularly 8 to 12% through the length of the outer pipe 73. By introducing steam with the ammonia, it is possible to avoid choking the pipe cross reactor. As discussed above, the exothermic reaction in PCR 7 is driven forward at high rate, thus producing large quantities of ammonium phosphate in a relatively short period of time, potentially causing problems of "plugging" or "choking" of the PCR 7.

The outer pipe 73 is supplied with phosphoric acid through an inlet 731 and supplied with scrubber water through an inlet 733. At the discharge end 713 of the inner pipe 71, the phosphoric acid reacts with the liquid ammonia. Scrubber water acts as a coolant to control the temperature of the PCR. Reference numeral 75 represents two plates, which seal the inner pipe 71 to the outer pipe 73. The plates 75 ensure that no ammonium phosphate is discharged at the upstream end of the PCR. Opposite the plates 75, the PCR has an outlet 77. The outlet 77 has a reduced diameter relative to the outer pipe 73. The reduced diameter maintains the PCR at an elevated pressure so that the reaction occurs quickly and violently, and the products are discharged. The diameter of the outlet 77 from the PCR 73 may be reduced to 10 to 50%, more particularly, 15 to 44% of the outer pipe 73 diameter. An elbow 79 may be provided at the outlet 77 to direct molten ammonium phosphate onto the rolling bed of the granulator 9. Specifically, the elbow 79 may direct the molten ammonium phosphate onto the recycled fines.

The pipe cross reactor may be operated at a temperature in a range of from 220 to 380° F., more particularly 250 to 350° F., and still more particularly 290 to 310° F. If the pipe cross reactor were to become plugged and choke, then the temperature could increase hundreds of degrees in a few seconds. It is, therefore, necessary to ensure that the PCR does not choke, and a plurality of thermo-couples 78 are provided for this purpose. Because of the elevated temperature, most of the water from inputs 733 and 712 exits as steam. When the molten ammonium phosphate exits the elbow 79, there is a substantial temperature drop, causing the molten ammonium phosphate to solidify upon discharge.

Figure 3:
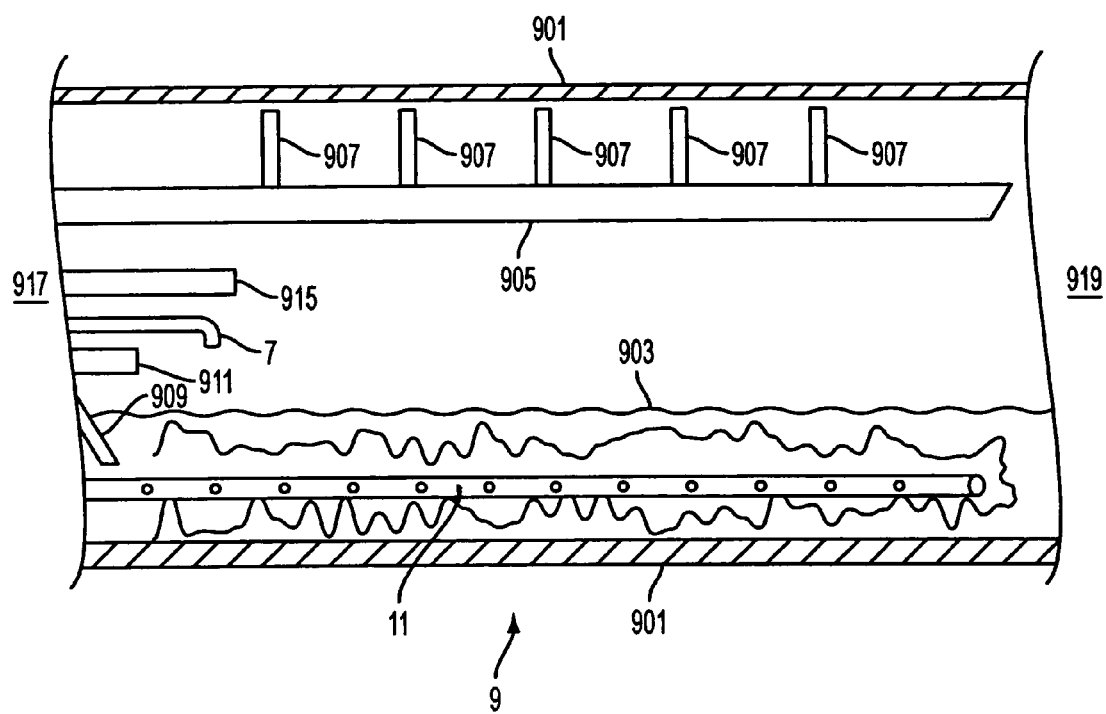
FIG. 3 is a cross-sectional view of a granulator shown in FIG. 1.

FIG. 3 is a cross-sectional view of a granulator shown in FIG. 1A. The granulator 9 is formed as a rotating drum having outer walls 901. As the drum rotates, a bed of ammonium phosphate partially builds up one of the walls inside the granulator 9. Reference numeral 903 represents the upper surface of the ammonium phosphate bed on the wall. Gravity together with a slowly moving scraper bar 905 having scraper blades 907 acts to keep the ammonium phosphate off the upper walls of the granulator. A series of the scraper blades 907 extend from the scraper bar 905 scraping any buildup off the granulator walls as the scraper bar 905 moves slowly back and forth into and out of the granulator shell. The granulator has a plurality of inputs. The recycled fines 13 are discharged into the granulator 9 through a conveyer 909. If desired, sulfur may be introduced through conduit 911. The output of conduit 911 is downstream from the introduction of the recycled fines 13. Reference numeral 7 represents the pipe cross reactor, which supplies the granulator 9 downstream from both the recycled fines 909 and the sulfur source 911. Ammonium phosphate from the preneutralizer is introduced through a conduit 915, which may be provided downstream from the pipe cross reactor 7.

Ammonia gas is added to the granulator 9 from the ammonia sparger 11. The ammonia sparger 11 has a plurality of holes to release ammonia and is provided beneath the rolling bed of ammonium phosphate. A collar is provided at an inlet end 917 of the granulator. A collar is also provided at an outlet end 919 of the granulator. To ensure that the product exits from the outlet end 919 (and not the inlet end 917), the collar at the outlet 919 is narrower than the collar at the inlet 917. Thus, the elevation at the outlet 919 is reduced.

By adding one or more micronutrients according to the method described above, a fertilizer is produced, which has the micronutrient(s) in an amount of 0.01 wt. % to 5 wt. %, more particularly 0.1 to 3 wt. %, and still more particularly 0.1 to 1.5 wt. %. With the process described above, micronutrients are evenly distributed throughout the fertilizer such that a small amount of the micronutrient can be uniformly delivered to the plants being fertilized.

EXAMPLES

Two tests were run to determine if micronutrients could be introduced into fertilizer using a pipe cross reactor. Both tests examined a MAP formulation with about 1 wt. % zinc content, where all of the zinc material (provided as zinc oxide (ZnO)) was dissolved in the phosphoric acid fed to the PCR. It should be noted that zinc compounds other than ZnO may be used as a zinc source. For the PCR, three quarter inch Hastelloy C pipe was used. The outer pipe had a length of 84 inches. The inner pipe was formed of a one-quarter inch Hastelloy C pipe. The exit from the inner pipe was 9 inches from the entrance to the PCR. At the exit from the PCR, a ⅛ inch elbow was provided.

The first test added both elemental sulfur and sulfate sulfur. The second test did not add any sulfur. The ⅛ inch opening to the Hastelloy C pipe provided sufficient flux at the discharge and provided a good spray pattern. In both the first and second tests, two thirds of phosphoric acid added was supplied through the PCR where it was partially reacted with anhydrous ammonia. The remaining one third of the phosphoric acid was partially neutralized with anhydrous ammonia in a preneutralizer reactor. The under bed ammonia sparger in the granulator was used to complete the ammonia addition and produce an N:P mole ratio of 1:1 at the discharge of the granulator. In both cases, the PCR operated very well, partially ammoniating the bulk of the phosphoric acid prior to spraying it into the granulator.

For the first test, where sulfur was added, dissolution of ammonium sulfate (the sulfate source) and ZnO into the acid tank for the PCR did not materially affect the performance of the PCR. The heat in the PCR was controlled by cooling with low pressure steam. For the second test, only ZnO was added to the acid tank feeding the PCR. The ZnO did not materially affect the performance of the PCR. The temperature of the PCR was controlled with scrubber water. For the second test, the MAP was discharged at a temperature of about 350° F.

The products produced according to the first and second tests were analyzed, with the results being shown below.

| | Standard Analyses, % | | | Sulfur Assays, % | | | Zinc Assays, % | | | |
|---|---|---|---|---|---|---|---|---|---|---|
| | Tot. N | TPA | APA | SO$_4$—S | S° | Tot. S | Total | WS | CS | Avail. |
| Test 1 | 10.3 | 45.8 | 43.6 | 3.5 | 4.5 | 8.0 | 1.20 | 0.30 | 0.82 | 1.12 |
| Test 2 | 9.9 | 52.5 | 50.7 | 0 | 0 | 0 | 1.20 | 0.20 | 0.97 | 1.17 |

The standard analyses, the first three columns of the table, show total N (Tot. N), total P$_2$O$_5$ (TPA), and available P$_2$O$_5$ (APA), respectively. For the first test, it was determined that the fertilizer had 3.5 wt. % of sulfate sulfur (SO$_4$—S) and 4.5 wt. % of elemental sulfur (S°), with total sulfur (Tot. S) of 8.0 wt. %. For the zinc micronutrient, the fertilizer contained 1.20 wt. % total zinc (Total). Of that 1.20 wt. %, 0.30 wt. % was water soluble (WS) and 0.82 wt. % was citrate soluble (CS). Thus, of the 1.2 wt. % added, 1.12 wt. % (Avail.) was in a form available for plant nutrition. For the second test, the fertilizer again contained 1.20 wt. % zinc. Of this 1.20 wt. %, 0.20 wt. % was water soluble, and 0.97 wt. % was citrate soluble. With 1.17 wt. % (Avail.) of the zinc available for plant nutrition, it was determined that the pipe cross reactor is a viable option for delivering micronutrients.

The invention has been described in detail with particular reference to preferred embodiments thereof and examples, but it will be understood that variations and modifications can be effected within the spirit and scope of the invention.

The invention claimed is:

1. A method of producing a phosphate fertilizer, comprising:
   adding a solid micronutrient to phosphoric acid in a heated, stined reactor to dissolve the micronutrient and produce an enriched acid;
   adding the enriched acid and liquid ammonia to a pipe cross reactor, the pipe cross reactor having inner and outer concentric pipes,
   adding ammonia to the inner pipe;
   adding phosphoric acid to the outer pipe;
   and allowing the enriched acid and the ammonia to react to produce ammonium phosphate.

2. A method of producing a phosphate fertilizer, comprising:
   adding a solid micronutrient to phosphoric acid in a heated, stirred reactor to dissolve the micronutrient and produce an enriched acid;
   adding the enriched acid and liquid ammonia to a pipe cross reactor to form a first portion of the phosphate fertilizer;
   allowing the enriched acid and the ammonia to react to produce ammonium phosphate
   combining gaseous ammonia and phosphoric acid in a preneutralizer to produce a second portion of the phosphate;
   supplying both the first portion of the phosphate fertilizer to a granulator;
   supplying the second portion of the phosphate fertilizer to the granulator at a location downstream from a phosphate outlet of the pipe cross reactor; and
   adding ammonia to the granulator to complete formation of the phosphate fertilizer.

3. A method of producing a phosphate fertilizer, comprising: producing a first portion of the phosphate in a pipe cross reactor; producing a second portion of the phosphate in a pre-neutralizer; supplying both the first and second portions of the phosphate to a granulator; and adding ammonia to the granulator to react with the first and second portions of the phosphate, wherein the first and second portions of the phosphate are produced by reacting ammonia with phosphoric acid, a target ratio of ammonia to phosphoric acid achieves a desired product, ammonia and phosphoric acid are supplied to the pre-neutralizer with an ammonia deficiency and an ammonia to phosphoric acid ratio less than the target ratio, and the ammonia added to the granulator compensates for the ammonia deficiency.

4. The method according to claim 3, wherein the second portion of the phosphate fertilizer is 22 wt. % to 38 wt. % of the phosphate fertilizer, with a remainder being produced in the pipe cross reactor and the granulator.

5. The method according to claim 3, wherein the first portion of the phosphate fertilizer is 62 wt. % to 72 wt. % of the phosphate fertilizer, with a remainder being produced in the pipe cross reactor and the granulator.

6. The method according to claim 3, wherein ammonia and phosphoric acid are supplied to the pipe cross reactor substantially at the target ratio.

7. The method according to claim 3, the second portion of the phosphate fertilizer has a water solubility at a given temperature, which is greater than a water solubility of phosphate produced using the target ratio.

8. The method according to claim 3, wherein the first portion of the phosphate fertilizer is produced by a process comprising: adding a micronutrient to phosphoric acid to produce an enriched acid; adding the enriched acid and ammonia to a pipe cross reactor; and allowing the enriched acid and the ammonia to react to produce the first portion of the phosphate fertilizer.

9. A method of producing a phosphate fertilizer, comprising:
   producing a first portion of the phosphate fertilizer comprising adding a solid micronutrient to phosphoric acid in a heated, stirred reactor to dissolve the micronutrient and produce an enriched acid; adding the enriched acid and liquid ammonia to a pipe cross reactor; and allowing the enriched acid and the ammonia to react to produce ammonium phosphate;
   producing a second portion of the phosphate fertilizer comprising combining ammonia and phosphoric acid in a pre-neutralizer to produce a second portion of the phosphate fertilizer; adding a micronutrient to the phosphoric acid before the phosphoric acid is combined with ammonia in the pre-neutralizer; and
   supplying both the first and second portions of the phosphate fertilizer to a granulator.

10. The method according to claim 9, wherein a plurality of micronutrients are added.

11. The method according to claim 9, wherein the micronutrient is at least one element selected from the group consisting of zinc, manganese, iron, copper, molybdenum, boron, chlorine, cobalt and sodium.

12. The method according to claim 9, wherein the micronutrient is added to phosphoric acid in a stirred reactor.

13. The method according to claim 12, wherein the stirred reactor is heated.

14. The method according to claim 12, wherein the micronutrient is added as a solid compound, which dissolves in the phosphoric acid.

15. The method according to claim 12, wherein the micronutrient is zinc oxide.

16. The method according to claim 9, wherein the phosphate fertilizer contains 0.1 wt. % to 5 wt. % micronutrient.

17. The method according to claim 9, wherein the pipe cross reactor has an outlet with an inner diameter reduced to 10 to 50% of the inner diameter of the pipe cross reactor.

18. The method according to claim 9, wherein the pipe cross reactor has inner and outer concentric pipes, ammonia is added to the inner pipe, and phosphoric acid is added to the outer pipe.

19. The method according to claim 18, wherein steam is added to the inner pipe, and water is added to the outer pipe.

20. The method according to claim 18, wherein the inner pipe extends 1 to 25% through the length of the outer pipe.

21. The method according to claim 9, wherein a first portion of the phosphate fertilizer is produced in the pipe cross reactor, the method further comprises: combining gaseous ammonia and phosphoric acid in a preneutralizer to produce a second portion of the phosphate fertilizer; and supplying both the first and second portions of the phosphate fertilizer to a granulator.

22. The method according to claim 21, wherein 33 to 99 wt. % of the phosphate fertilizer is produced in the pipe cross reactor.

23. The method according to claim 21, wherein ammonia is added to the pipe cross reactor as a liquid, and ammonia is added to the preneutralizer as a gas.

24. The method according to claim 21, wherein the ammonia and phosphoric acid in the preneutralizer have a contact time of 5 to 55 minutes.

25. The method according to claim 21, wherein ammonia is added to the granulator to complete formation of the phosphate fertilizer.

26. The method according to claim 25, wherein ammonia and phosphoric acid are supplied to the preneutralizer at an ammonia to phosphoric acid ratio, which is less than an ammonia to phosphoric acid ratio used for the pipe cross reactor, and the second portion of the phosphate fertilizer produced from the preneutralizer has a higher water solubility at a given temperature than the phosphate produced in the pipe cross reactor.

27. The method according to claim 25, supplying the second portion of the phosphate fertilizer to the granulator at a location downstream from a phosphate outlet of the pipe cross reactor.

28. The method according to claim 27, wherein a portion of the phosphate fertilizer leaving the granulator is recycled back to the granulator, and recycled phosphate fertilizer is introduced at a location upstream from the phosphate outlet of the pipe cross reactor and the location where the second portion of the phosphate fertilizer is fed to the granulator.

29. The method according to claim 25, wherein granulated phosphate fertilizer exits the granulator, a portion of the granulated phosphate fertilizer exiting the granulator is recycled back to the granulator.

30. The method according to claim 29, wherein granulated phosphate fertilizer exiting the granulator is dried and then separated according to particle size.

31. The method according to claim 30, wherein undersized particles are recycled back to the granulator, and oversized particles are crushed and then recycled back to the granulator.

* * * * *

UNITED STATES PATENT AND TRADEMARK OFFICE
CERTIFICATE OF CORRECTION

PATENT NO.        : 7,497,891 B2                                                                Page 1 of 1
APPLICATION NO.   : 10/929501
DATED             : March 3, 2009
INVENTOR(S)       : Lawrence A. Peacock It is certified that error appears in the above-identified patent and that said Letters Patent is hereby corrected as shown below:

Col. 7, line 35, delete "stined" and insert --stirred--

Signed and Sealed this

Tenth Day of August, 2010

David J. Kappos
*Director of the United States Patent and Trademark Office*